(12) United States Patent  
Taylor

(10) Patent No.: US 7,951,350 B1
(45) Date of Patent: May 31, 2011

(54) FUEL-GAS REFORMING SYSTEMS AND METHODS

(75) Inventor: Donald Taylor, Irvine, CA (US)

(73) Assignee: West Biofuels, LLC, San Rafael, CA (US)

( * ) Notice: Subject to any disclaimer, the term of this patent is extended or adjusted under 35 U.S.C. 154(b) by 1126 days.

(21) Appl. No.: 11/698,758

(22) Filed: Jan. 26, 2007

(51) Int. Cl.
*C01B 31/18* (2006.01)
*C01B 3/24* (2006.01)
*C01B 3/26* (2006.01)
*C10J 3/46* (2006.01)

(52) U.S. Cl. ............ 423/418.2; 48/197 R; 48/202; 48/210; 252/373; 423/650; 423/651; 423/652; 423/653; 423/654

(58) Field of Classification Search .............. 423/650, 423/651, 652, 653, 654, 418.2; 252/373
See application file for complete search history.

(56) References Cited

U.S. PATENT DOCUMENTS

| | | | | |
|---|---|---|---|---|
| 2,464,616 A | * | 3/1949 | Schwarzenbek et al. | 208/149 |
| 2,642,346 A | * | 6/1953 | Keith | 48/198.6 |
| 2,690,963 A | * | 10/1954 | Herbst | 48/198.6 |
| 2,982,622 A | * | 5/1961 | Silveston et al. | 423/650 |
| 3,524,819 A | | 8/1970 | Guerrieri | |
| 4,126,668 A | * | 11/1978 | Erickson | 423/657 |
| 4,310,503 A | * | 1/1982 | Erickson | 423/657 |
| 4,758,375 A | | 7/1988 | Brophy et al. | |
| 4,999,133 A | | 3/1991 | Banquy | |
| 5,395,813 A | | 3/1995 | Clavenna et al. | |
| 5,639,929 A | | 6/1997 | Bharadwaj et al. | |
| 6,267,912 B1 | | 7/2001 | Hershkowitz et al. | |
| 6,331,283 B1 | * | 12/2001 | Roy et al. | 423/652 |
| 6,641,625 B1 | | 11/2003 | Clawson et al. | |
| 6,949,683 B2 | | 9/2005 | Wieland et al. | |
| 7,008,560 B2 | | 3/2006 | Ramani et al. | |
| 7,008,967 B2 | | 3/2006 | Keyser et al. | |
| 7,066,984 B2 | | 6/2006 | Dunn | |
| 7,740,829 B2 | * | 6/2010 | Becker et al. | 423/650 |
| 7,824,574 B2 | * | 11/2010 | White et al. | 252/373 |
| 2001/0055559 A1 | * | 12/2001 | Sanfilippo et al. | 423/648.1 |
| 2005/0232859 A1 | * | 10/2005 | Sanfilippo et al. | 423/652 |
| 2006/0009352 A1 | | 1/2006 | Zhao et al. | |
| 2006/0143980 A1 | | 7/2006 | Rapier et al. | |
| 2008/0164443 A1 | * | 7/2008 | White et al. | 252/373 |
| 2008/0260629 A1 | * | 10/2008 | Morin et al. | 423/651 |

FOREIGN PATENT DOCUMENTS

JP 2004-115365 4/2004
JP 2004-339007 12/2004

* cited by examiner

*Primary Examiner* — Wayne Langel
(74) *Attorney, Agent, or Firm* — Thorpe North & Western LLP

(57) ABSTRACT

A process and system for producing an effluent gas containing carbon monoxide and hydrogen is presented. The process includes introducing a fuel gas including a hydrocarbon and a reformer gas into a reactor system. The reformer gas may include steam, $CO_2$, or a mixture thereof. Under steam reforming temperatures and pressures, the gases are reacted in the presence of reactant solids. The reaction process produces a carbon monoxide and hydrogen containing effluent, which may be withdrawn from the reactor system.

18 Claims, 3 Drawing Sheets

FUEL-GAS REFORMING SYSTEMS AND METHODS

BACKGROUND OF THE INVENTION

The steam reforming of hydrocarbons, such as methane, ethane, propane, butanes, light naphtha, and the like, is most often accomplished in externally heated tubes which contain catalyst. The product of such process is a synthesis gas composed primarily of $H_2$ and CO. This type of process is known in the art, and is regularly practiced at industrial scale. In general, a hydrocarbon and steam mixture in the proper proportion is introduced into a reformer furnace, containing a plurality of parallel tubes packed with a suitable reforming catalyst. The tubes are externally heated to provide the endothermic heat of reaction for the reforming process, with the reaction generally being effected at a temperature above 1600 degrees F.

The above process has numerous limitations, especially that of effecting economic heat transfer through the tubes at the high temperatures and high heat fluxes employed in the steam reforming process. For example, in order to withstand the high temperatures used in steam reforming, expensive heat resistant alloys must be used in constructing the furnace, thereby raising capital costs. Moreover, carbon deposition on the catalyst necessitates the use of excess amounts of steam in the hydrocarbon and steam mixture, which serves to decrease the net conversion efficiency and results in a high ratio of $H_2$ to CO in the synthesis gas product when a 1:1 ratio is optimum for synthesis of some high-value products, including the production of mixed-alcohols. Furthermore, when $CO_2$ is present in the hydrocarbon and steam mixture and $CO_2$ is intended to participate in the reforming reactions, the deposition of carbon on the catalyst becomes more problematic and the catalyst is thereby deactivated.

Therefore, it would be advantageous to develop an improved process for reforming of hydrocarbons.

As such, it would be desirable to provide processes and systems which allow for improved steam reforming. Additionally, it would be desirable to provide processes and systems which allow for reduced cost materials.

SUMMARY OF THE INVENTION

It has been recognized that it would be advantageous to develop improved steam reforming processes. It has also been recognized that it would be advantageous to develop such processes which utilize lower-cost materials. Therefore, in accordance with the present invention a process for producing carbon monoxide and hydrogen containing effluent can include introducing a fuel gas and a reformer gas into a reactor system. The fuel gas may include a hydrocarbon.

The reformer gas may include steam, $CO_2$, or a mixture of the two. The fuel gas and reformer gas are reacted with reactant solids under steam reforming temperatures and pressures to produce a carbon monoxide and hydrogen containing effluent and spent solids. The effluent can then be withdrawn from the reactor system.

In one embodiment, heat carrier particulates can be present in the reactor system. The heat carrier particulates can be inert, and may also have reactant solids dispersed therein.

The spent solids of the process can be regenerated to form reactant solids which may be recycled and used as reactant solids for reaction with the fuel mixture and reformer gas.

Likewise, a system for producing carbon monoxide and hydrogen is presented. A system in accordance with the present invention can include a reactor system comprising a reactor and a regenerator operatively coupled in a manner that allows substantially only flow of solid particulate between the reactor and regenerator. Both reactor and regenerator can be staged and designed for counter-current flow of gasses and solids. In one alternative embodiment, at least the reactor is a staged counter-current flow, while the regenerator can be configured in any manner sufficient to regenerate the reactant solids. The reactor and regenerator include reactant solids and heat carrier particulates therein. The reactor may have a reactor gas inlet and a reactor gas outlet attached thereto and positioned at generally opposite ends of the reactor. The regenerator may also have a regenerator gas outlet and a regenerator gas inlet attached thereto and positioned at opposite ends. A spent solids recycle stream can connect the reactor near the reactor gas inlet and the regenerator near the regenerator gas outlet.

As such, reforming of hydrocarbons to produce a synthesis gas can be readily accomplished with improved heat transfer and use of low-cost particulate reactant solids.

Additional features and advantages of the invention will be apparent from the detailed description which follows, taken in conjunction with the accompanying drawings, which together illustrate, by way of example, features of the invention.

DESCRIPTION OF THE DRAWINGS

In the accompanying drawings which illustrate embodiments of the invention.

Figure 1:
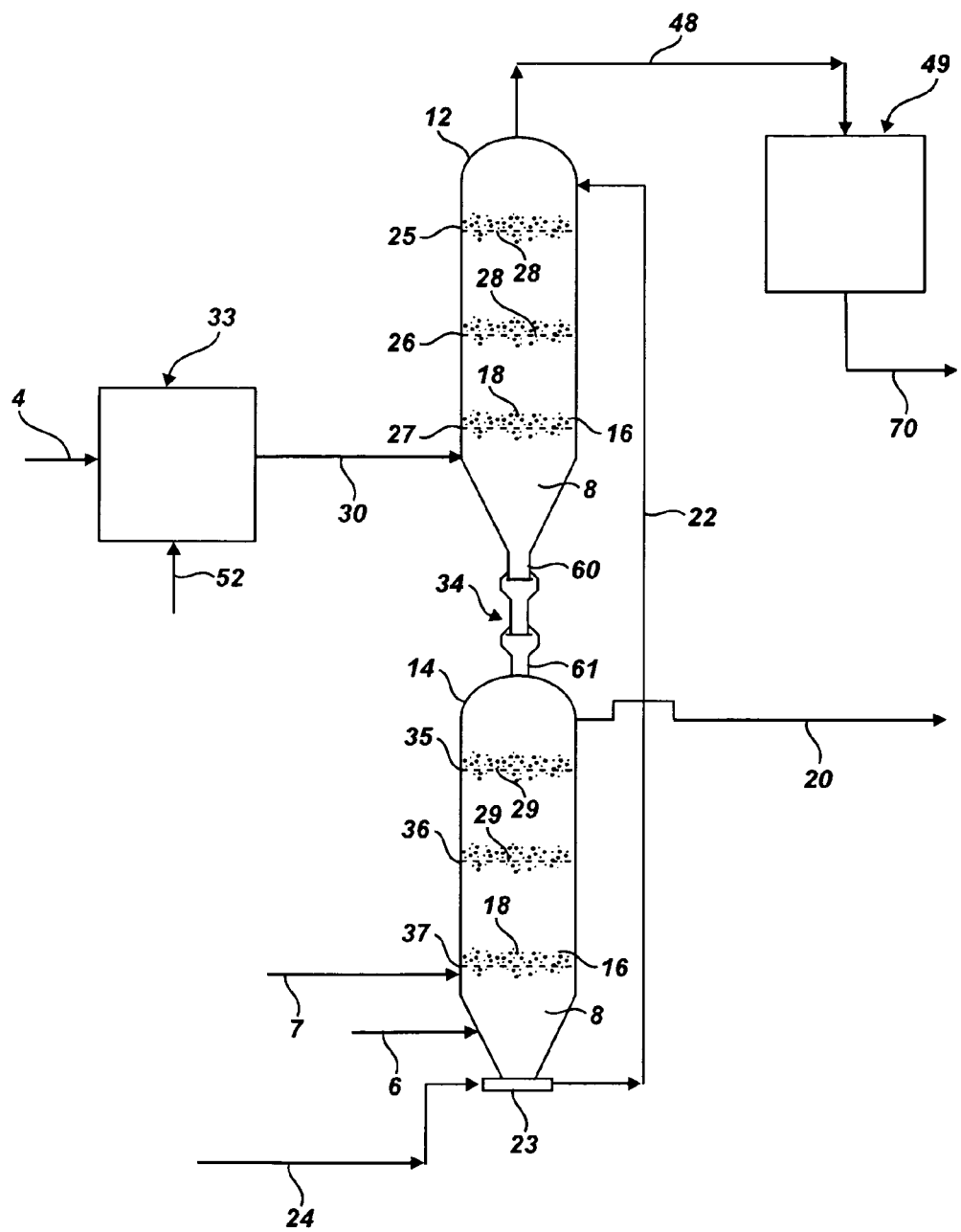
FIG. 1 is a schematic representation of an embodiment of the process of the invention.

It will be understood that the above drawings are not necessarily to scale and variations can be had in dimensions, orientations, and features without necessarily departing from the scope of the present invention. Further, the drawings may omit certain features or equipment in the interest of clarity, valves, electronic controls, pumps, etc.

DETAILED DESCRIPTION OF THE PREFERRED EMBODIMENT(S)

Before the present invention is disclosed and described, it is to be understood that this invention is not limited to the particular structures, process steps, and materials disclosed herein, such as process steps and materials may vary to some degree. It is also to be understood that the terminology used herein is used for the purpose of describing particular embodiments only and is not intended to be limiting, as the scope of the present invention will be limited only by the appended claims and equivalents thereof.

It must be noted that, as used in this specification and the appended claims, the singular forms "a," "an," and "the" include plural referents unless the content clearly dictates otherwise.

As used herein, "reactant solids" refer to solid, substantially insoluble materials which chemically react with the mixture to form a distinct material, e.g. spent solids, which is different from the starting material. Typically, the reactant solids are metals and/or metal oxides such as, but not limited to iron, iron oxide, aluminum, aluminum oxide, alkali metals, and compounds incorporating such elements. In this usage, the term metal is to expressly include alkali. The spent solids can be regenerated to form the original reactant solids. Reactant solids actively participate and/or react during the steam reforming process and form a material that is different from the starting material. Regarding reactant solids, the term "finely divided" refers to solid particulates that are discrete particles. Most often, the finely divided particles are of a size from about 0.1 microns to about 100 microns, and most often from about 1 micron to about 30 microns. In one embodiment, greater than about 50% of the particulates can have an average particle size of less than about 50 microns.

As used herein, the term "steam" refers to water vapor. Although the reformer gas can consist essentially of water vapor, other gases can also be present in some embodiments such as carbon dioxide, nitrogen, etc. In one embodiment of the present invention, steam is the primary component of the reformer gas. In another embodiment, carbon dioxide is the primary component, and in still another embodiment, both steam and carbon dioxide are the primary components in the reformer gas.

As used herein, "hydrocarbon" refers to generally light hydrocarbons (e.g. less than or equal to about $C_5$: methane, ethane, propane, etc.), and further includes naptha. Also contemplated are process streams containing any of the noted light hydrocarbons and/or naptha. Typical feedstock hydrocarbons are primarily in the gas phase above about 500° F., although carbonaceous solids can also be present as a minor fraction. Although, any hydrocarbon fraction can be used as long as the feedstock is converted to a gas-phase product at the processing temperature, and can include a minor fraction of carbonaceous solids that are finely divided enough to be entrained by the flow of gaseous fraction. A minor fraction of finely divided carbon is also susceptible to reforming in the process, which is a significant improvement, because in typical reforming methods carbon deposition is a significant mechanism for deactivating the catalyst and/or reactants that are present.

The terms "heat carrier," "heat-carrier," and "heat carrier particulates" are used interchangeably and refer to solid particulates that effectively transfer heat from a pre-heating area to the reformer-reactor. Such heat carrier particulates can be inert to the materials used in the present invention, and may further be substantially spherical. In one embodiment, they may have an average diameter of from about 0.1 mm to about 3 mm, or from about 0.5 mm to about 1.5 mm. Heat carrier particulates may be ceramic solids and can include, but are not limited to, such materials as alumina beads, titania beads, zirconia beads, and combinations thereof.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In accordance with the present invention steam, $CO_2$, or steam/$CO_2$ reforming of a hydrocarbon mixture can be accomplished in a counter-current moving-bed reactor, where particulate solids flow generally downward under the force of gravity and the gaseous mixture to be reformed moves generally upward due to differential pressure between the inlet and the outlet. In one embodiment, the steam, $CO_2$, or steam/$CO_2$ reforming operation can be effected by contacting the gaseous mixture with particulate solids. Such particulate solids may include heat carriers and/or reactant solids. In one embodiment, the particulate solids are provided at high temperatures, ranging from about 1200° F. to about 2200° F. In a further embodiment, the steam reforming temperatures are between about 1400° F. and about 2000° F. In still a further embodiment, the steam reforming temperatures may be from about 1650° F. to about 1850° F.

The systems of the present invention can be operated at any pressure conducive to the steam reforming reactions between the incoming gases and the solid reactants. As a general guideline, suitable steam reforming pressures can be between about atmospheric, e.g. 14.7 psig, to about 800 psig. In another embodiment, the pressure may range from about atmospheric pressure to about 150 psig. Further, the pressure may range from about 14.0 psig to about 660 psig. Lower pressures generally favor formation of CO and $H_2$ because there are more molecules in the product after reforming and increasing the pressure would tend to drive the reforming reactions in the wrong direction. Higher pressure tends to favor the formation of methane. However, the pressure range of about 40 psig to about 150 psig tends to increase the rate of reforming because there are more molecules present to react and the methane forming reactions are not enhanced significantly until the pressure is above about 200 psig. On the other hand, high temperature favors formation of CO and $H_2$, and decreased formation of $CH_4$. Therefore, higher temperature is used to offset the effect of pressure, and higher pressure is generally desirable because the syngas product is typically used for syntheses at some pressure above 250 psig. Thus, there can be a trade-off of using lower pressure and lower temperature to achieve the result of less complex and low-cost processing hardware, while accepting the down-side that more gas compression may be required prior to use in the final synthesis process. Alternatively, operation at about 40 psig can be useful, and in some embodiments as high as 150 psig, although higher pressures are currently less preferred. The reforming reactions and reformer of the present invention are most often operated under endothermic conditions.

Typically, the mass ratio of steam and $CO_2$ to hydrocarbon can affect efficiencies and yields. The steam and $CO_2$ to hydrocarbon weight ratio may range from about 0.1 to about 4.0, although other ratios may be used. In still another embodiment, the ratio of steam and $CO_2$ to hydrocarbon may range from about 0.3 to about 2.0. Additionally, the ratio of steam and $CO_2$ to hydrocarbon may range from about 0.5 to about 1.0. Process economics and energy efficiency are improved as the steam/fuel ratio approaches zero. The exact choice of conditions, however, is dependent upon the particular hydrocarbon composition and the desired syngas composition. The reaction temperature may be maintained by circulating the particulate solids through a suitable heater and/or reactant regenerator, preferable a heater where the particulate solids flow downward, counter-current to the upward flow of combustion exhaust gases with low oxidation.

As noted above, the particulate solids may include a heat carrier. The heat carrier can generally be inert, and may further include substantially spherical-shaped solids, such as alumina or zirconia beads. Non-spherical particulates can also be used; however, care should be taken to avoid excessive plugging or blockage. The spherical solids may have a diameter between about 0.5 and 1.5 mm. The particulate solids may additionally or alternatively include reactant solids as separate materials or as a composite or coated particle. In one embodiment, the particulate solids include both heat carrier and reactant solids, wherein the reactant solids are dispersed in the heat carrier. In this way, the synergistic function of the comingled solid reactants with the heat carrier can result in optimized mass-transfer to maximize heat transfer while also maximizing available surface area of the reactant solids for reaction with the incoming gases. The combined mass of the spherical heat carrier and finely divided reactant solids, that fill the spaces between close-packed spheres, can also act as a dense heat sink to moderate temperature fluctuations.

Finely divided reactant solids can be relatively low-cost materials compared to catalyst materials manufactured into shapes. For example, pulverized iron ore or calcium in the form of limestone, or a mixture iron and calcium, and the like, are examples of reactants used in the process to enhance the reforming of hydrocarbons by reacting with carbon and hydrocarbons, and can be substantially regenerated in a solids heater by contacting with combustion exhaust gases that provide a thermochemical environment with medium to low oxidation potential, such that carbon deposits may be removed via oxidized and the metal and alkali reactants are partially oxidized as described in more detail herein.

The metal and alkali reactants that may be employed can be finely divided and highly dispersed with the heat-carrier, and generally have an average particle size ranging from about 0.1 microns to about 100 microns. Further, the reactant solids may have an average particle size ranging from about 1 micron to about 30 microns. It should be readily apparent, however, that the optimum particulate and reactant size can vary based on the properties of the substance, and the selection of the proper reactant or mixture of reactants is well within the scope of one skilled in the art based the teachings of the invention.

The more finely divided the particles the more surface area and the greater the rate reactivity via gas-solids contacting. The tendency during processing is to form more fine particles through attrition. However, very finely divided particles are not easy to process in typical fluidized beds and moving reactors because the particle-to-particle interactions, primarily due to static charge, are more powerful than the effect of gravity, which prevents the finely divided particles from flowing properly. Continuous agglomeration can be desirable, but comminution during continuous processing is generally acceptable. The finely divided solids can be effectively used by including larger size spherical solids (e.g. 0.3 mm-0.6 mm diameter alumina beads) that serve as heat carriers and maintain a uniform flow and circulation of solids even in the presence of the fines solids that otherwise could only be processed using pneumatic methods, such as gas-phase processing in cyclones or other types of transport reactors.

The invention is similar in operation to the well known Fluid Catalytic Cracker designs; the so called FCC units operate universally in petroleum refining operations world wide, and result in circulating a cracking catalyst between a cracking reactor and a regenerator to affect the cracking of heavy hydrocarbons into lighter hydrocarbons. However, the subject invention differs significantly from FCC units because the operation is at much higher temperature, reforming is accomplished with finely divided reactants rather than catalysts, operation is counter-current, and results in production of high quality synthesis gases. For example, FCC units operate at lower temperature in order to prevent excessive thermal cracking of the gasoline and other liquid fractions; FCC units require high enough temperature to crack off carbon chains with 2 to 10 carbons, and predominately in the liquid range, while leaving a residue of condensed polyaromatic molecules formed into dense carbonaceous char type particles. The process of the present invention operates at a higher temperature ranges than FCC units with the aim of cracking essentially all the hydrocarbons in the feed into low molecular products, primarily CO and $H_2$, and some low molecular weight olefins, containing 2 to 4 carbons. Higher temperature is also used to enhance the rate of thermal cracking. However, the process of the present invention also operates the reforming reactions well below the fusion temperature of the minerals that act as solid reactants.

The invention will be further described with reference to the specific embodiments illustrated in the drawings. The equipment is schematically represented and ancillary equipment such as valves, in-line cyclone separators, control and monitoring devices, and the like, have been omitted to simplify the description. The choice of specific equipments is deemed well within the scope of a person skilled in the art from the description of the invention. Thus, for example, it should be readily apparent that the reactor-reformer and the heater-regenerator should be constructed of materials capable of withstanding the high temperature and pressure conditions employed in the process, e.g., use of refractory lined vessels. The gaseous input and output streams are caused to flow using traditional methods, including blowers, induction fans, venturi-eductors, and compressors, the selection depending largely on the system operating pressure and the source of motive power that would include, for example, electric motors, and steam or process gas expansion devices, none of which are shown to simplify the description. Further, access ports or other lines may be useful for replenishing solid reactant lost due to elutriation, reactant solids entrainment with effluent, cleaning, monitoring, and viewing access, or the like.

Referring to FIG. 1, steam, $CO_2$, or a steam and $CO_2$ mixture, can be introduced through a line 6. A fuel-gas mixture, including hydrocarbons such as methane and ethane, is introduced through a line 7 into a reactor-reformer 14, containing a heat-carrier 8, such as spherical ceramic particles, and a suitable solid reactant 16, such as finely divided iron or iron oxide, collectively identified as a moving bed material 18 composed of particulate solids, and preferably including structurally stable alumina beads and reactive iron oxide power.

The feed can be introduced into the reactor-reformer 14 at a superficial velocity that is lower than the minimum fluidization velocity, generally on the order of about 0.5 to about 2 ft/sec. The bed material 18 can be maintained at a temperature sufficient to affect steam or $CO_2$ reforming of the hydrocarbon. A gaseous effluent, containing primarily carbon monoxide and hydrogen, is withdrawn from the reactor-reformer 14 through a discharge duct 20. Typically, the effluent can contain from about 1 vol % to about 10 vol % hydrocarbon.

The bed material 18 can be continuously withdrawn therefrom through a venturi eductor 23 and combined with a motive-gas introduced through a line 24, such as flue-gas or steam functioning as a pneumatic carrier for delivering the bed material 18 through a line 22 to a heater-regenerator 12 located above the reactor-reformer 14.

The heater-regenerator 12 contains moving-bed distributor plates 25, 26, and 27, and the bed material 18 is conveyed through the line 22 by motive-gas and both are discharged into the top of the heater-regenerator 12. The bed material 18 is held up by the distributor plates 25, 26, and 27, to effect counter-current heating and regeneration thereof. Bed-material 18 trickles downward under the influence of gravity, flowing through apertures 28 located in the distributor plates 25, 26, and 27, which can provide about 20% open area. In a counter-current mode of operation, hot combustion exhaust gases pass upward through apertures 28, contacting the heat-carrier 8, while the reactant 16 will tend to flow in both a co-current and counter-current path, depending on the particle size. In one embodiment, the apertures in the plates may provide up to about 40% of open area, although such can be adjusted based on the desired solid flow rates, particles sizes, and other factors. The apertures can be circular holes or any other suitable shape which allows particles to flow through the distributor plates.

The bed material 18 flows generally downward in the heater-regenerator 12 and is held up sequentially by the distributor plates 25, 26, and 27 to effect heating thereof and to provide sufficient retention time to burn some fraction of carbon deposited on the reactant 16. Further, the reactant, i.e. as recycled spent solids from the reactor 14 can be regenerated therein by rising hot combustion exhaust gases with medium to low oxidation potential. Regeneration of the spent solids to solid reactants can generally be at a temperature between about 1600° F. to about 2300° F., and most often from about 1850° F. to about 2200° F. However, actual temperatures can depend on the particular materials, and the maximum temperature being that which the particular reactant formulation 16 requires for subsequent rapid reaction and production of carbon monoxide and hydrogen when contacted with the gas mixture in the reforming reactor 14.

It is to be understood, however, that three distributor plates are illustrated in order to facilitate the understanding of the embodiment and more or less distributor plates may be employed depending on the results desired. The thermal efficiency of the process tends to increase by increasing the depth of the bed material 18. In one embodiment, the reactor and/or the regenerator can contain from about 2 to about 20 stages. In a further embodiment the reactor or the regenerator may contain from about 3 to about 8 stages. The specific optimal number of stages for each can depend on the specific design parameters, tray efficiencies, and the like and can be sized and designed by those skilled in the art based on the guidance provided herein. The stages can be formed by any suitable or known multi-stage equipment including, but not limited to, moving-bed distributor plates, sieves, mesh, or any horizontal phase-contacting trays. Ultrasound, motion and/or other vibration can generally be applied to the plates in order to facilitate flow of the solid particles and to reduce channeling or clogging. In one preferred embodiment, the stages may be formed by moving-bed distributor plates.

The hot combustion exhaust gases employed for heating and regenerating the bed material 18 enter the heater-regenerator 12 through a connecting duct 30. The hot exhaust gases are supplied as the effluent from a combustion process 33, such that waste-heat is thereby used to drive the endothermic reforming processes of the invention. Generally, almost any source of flue-gas having a temperature between about 1600° F. and about 2300° F. that does not interfere with or contaminate the reactant solids can serve the purpose of providing sensible heat to the regenerator 12; however, particularly preferred are combustion flue gases.

In one embodiment, the flue-gas has an oxygen content between about 0.5 and about 10%, although up to 21% can be suitable under some conditions. The oxygen content in the flue-gas carrying waste-heat to the regenerator 12 can be adjusted by modifying the stoichiometry in the combustion process 33 by adjusting the air input through a line 4 in relationship to the fuel input through a line 52. Preferably, the oxygen content, and thus the oxidation potential, in the line 30 can be adjusted to maintain the reactant 16 in a reduced state, or a partially oxidized state, and not in a fully oxidized state. Adjustment of combustion stoichiometry to control the oxidation potential of the effluent gases can be readily accomplished by those skilled in the art based on the directions provided herein. The regenerator can receive mostly sensible heat from combustion exhaust gases, and synergistically provide some oxidation potential to accomplish a modest amount of controlled oxidation of metals, without also driving the metals to their highest oxidation state. The oxygen content can also react with carbon to provide heat. Thus, the partial oxidation process occurring in the regenerator 12 can involve a substantial oxygen content, which is more than merely incidental oxygen present in the feed stock. As a general guideline, the oxygen content of the incoming flue gas can be modified in order to provide a stoichiometric ratio of oxygen to solid reactant from about 0.1 to about 1.0, and preferably about 0.2 to about 0.4. As a result, the spent solids and solid reactant can be regenerated while additional heat is provided to the heat carrier 8 to form a fully heated and regenerated bed material 18.

The flue gas can be withdrawn from the heater-regenerator 12 through a line 48, passed through a waste heat boiler 49 where final oxidation of trace fuel components may be accomplished and the exhaust is purified in systems not shown before release to the atmosphere through a line 70 or directed to biofiltration for recovery and utilization of $CO_2$ in solar ponds growing algae, e.g. where $CO_2$ is captured in water as carbonic acid where it is consumed by spiralina algae used to produce animal feed via solar carbon sequestration. Some CO may be produced that can be fully oxidized downstream into $CO_2$ before being exhausted to the atmosphere or directed to bio-sequestration. The typical POX process that produces syngas as a product stream can use concentrated oxygen (containing >than 93% oxygen) and results in a product stream, rather than an exhaust or $CO_2$-rich product stream.

The fully heated and regenerated bed material 18, composed of particulate solids that flow freely under the influence of gravity, can pass through line 60 and downward through a double-dump valve 34 that serves to minimize the exchange of gases between the heater-regenerator 12 and the reactor-reformer 14. The bed material 18 passes downward through line 61 and enters the top section of the reactor-reformer 14. Although a double-dump valve is currently preferred, any valve or connection can be used which minimizes flow of gases between the regenerator and reactor.

The reactor-reformer 14 can contain moving-bed distributor plates 35, 36, and 37, and the bed material 18 trickles downward under the influence of gravity, flowing through holes 29 located in the distributor plates 35, 36, and 37 providing about 20% open area. In counter-current mode of operation, steam, $CO_2$ and fuel-gas containing hydrocarbons pass upward through holes 29, contacting the heat carrier 8, while the reactant 16 will tend to follow both a co-current and counter-current path, depending on the particle size, thus effecting the reforming of hydrocarbons into carbon monoxide and hydrogen.

It is to be understood, however, that three distributor plates are illustrated in order to facilitate the understanding of the embodiment and more or less stages and thus, in this example, distributor plates may be employed depending on the results desired. The efficiency of the thermal reforming process tends to increase with an increasing depth of bed material 18 until the pressure drop becomes excessive. The number of stages in the reactor can be designed based on the incoming fuel-gas mixture 7, steam/$CO_2$ supply 6, flow rates, etc in order to optimize the production of carbon monoxide and hydrogen gas which can be removed from the reactor via discharge duct 20. The carbon monoxide and hydrogen rich gas can then be further purified and/or used in any number of industrial processes or applications.

The reactor-reformer 14 can be operated under reforming conditions. As a general guideline, the reformer can be substantially free of oxygen, although oxygen atoms are present as constituents of covalently bonded molecules, including $H_2O$ and $CO_2$, and as such are reformed and oxygen is consumed to form CO. Oxygen content that reacts to for CO can also be supplied by the solid reactant, such as the case with $Fe_2O_3$, which is reduced to $FeO+CO$ by reaction with carbon, for example. Further, the operating temperatures can range from about 1200° F. to about 1850° F., and usually less than about 1650° F. and operating pressures can less than about 150 psi and preferably less than about 100 psi or 40 psi and many cases about atmospheric pressure. The temperature, oxygen content, pressure and gas components can be readily controlled to cyclically reduce and/or oxidize the solid reactants in order to achieve the desired reforming reactions. Typically, this involves reduction of the solid reactant within the reactor-reformer 14 and controlled oxidation within the regenerator 12, although this can depend on the particular solid reactant and relative oxidation potentials in each stage.

Numerous modifications of the process and systems of the present invention are possible without departing from the scope thereof. Thus, for example, low-cost fine particulate solids other than iron, iron oxide, calcium and calcium oxide, can be used as the reactant 16, e.g. potassium, and a traditional reforming catalyst, such as nickel supported on alumina, e.g., 4-7 wt. percent nickel supported on high porosity alumina, could be added to the bed material 18, although the use of an inert heat carrier with either high or low porosity is preferred. In addition, the bed material 18 may be circulated between the reactor-reformer 14 and the heater-regenerator 12 by a pneumatic carrier other than flue gas, for example, steam, fuel-gas, or carbon dioxide. These and other modifications should be apparent to those skilled in the art from the teachings contained herein.

Figure 2:
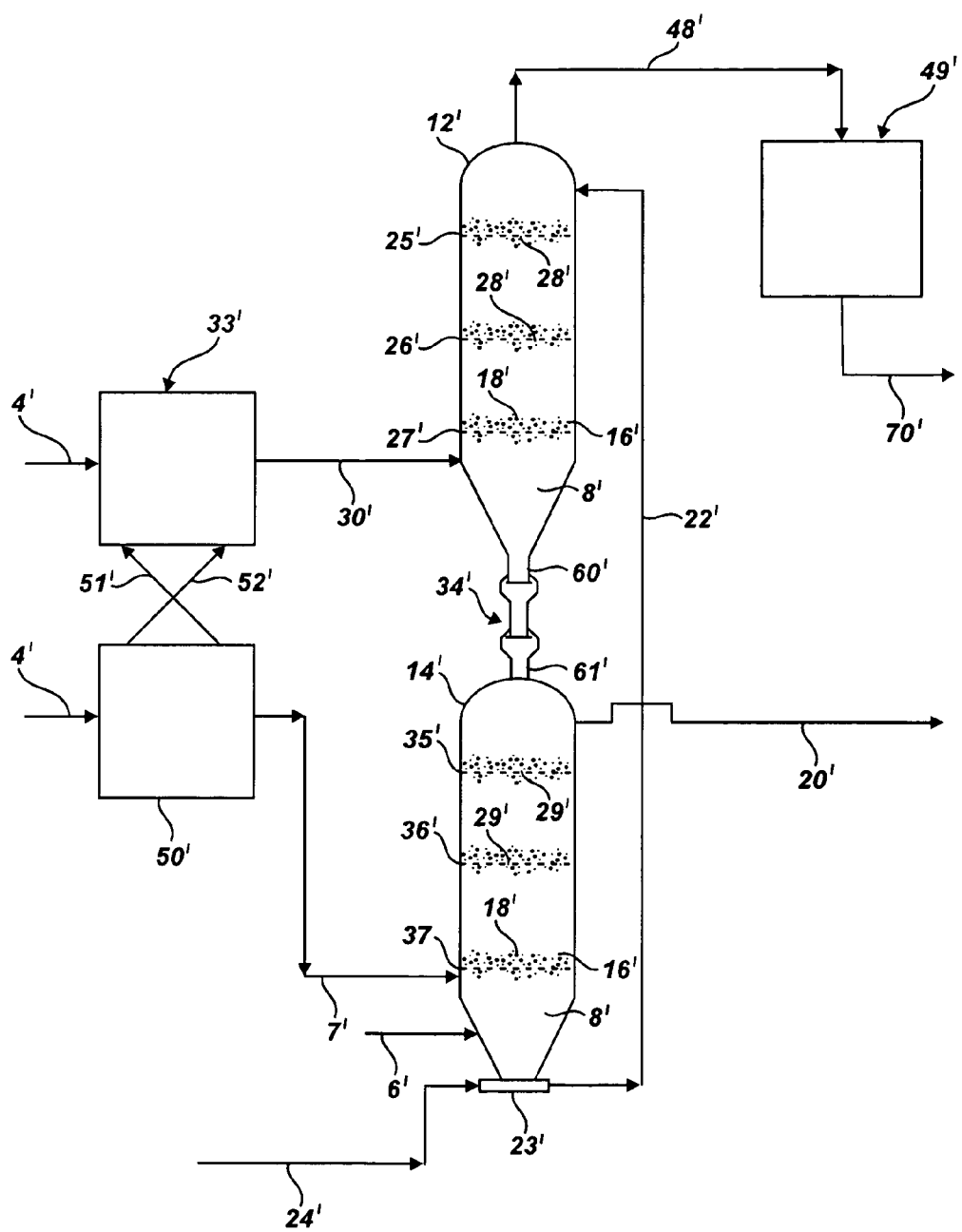
FIG. 2 is a schematic representation of another embodiment of the invention.

Another embodiment of the process of the invention is illustrated in FIG. 2. The embodiment illustrated in FIG. 2 operates similarly to the embodiment illustrated in FIG. 1, except that the fuel-gas containing hydrocarbons to be reformed by the process of the invention is the effluent from a dual-fluidized-bed gasification system and the hot combustion exhaust gases emanate from the regeneration side of the same dual-fluid bed gasification system. Accordingly, the portions of the embodiment illustrated in FIG. 2 which function similarly to those illustrated in FIG. 1 are indicated by like prime numerals.

Referring now to FIG. 2, there is provided a fluid-bed gasification reactor 50' that receives heated particulate solids through a line 51' from a fluid-bed combustor 33' and returns particulate solids and carbon-char from the fluid-bed gasification reactor 50' through a line 52' to the fluid-bed combustor 33'. The gasification reactor 50' processes solid carbonaceous feedstocks received as input through a line 5' and results in production of a fuel-gas effluent conveyed through a line 7'. The combustor 33' is provided with combustion air through a line 4', fuel in the form of carbon-char through a line 52', and the resulting hot combustion exhaust effluent is discharged through a line 30'.

It is to be understood that the fluid-bed combustor 33' delivers hot combustion exhaust gases through the line 30' to a heater-regenerator 12' that functions similarly to the process of the invention disclosed in FIG. 1, and furthermore, the fluid-bed gasification reactor 50' delivers fuel-gas containing hydrocarbons through the line 7' to a reactor-reformer 14' that functions similarly to the process of the invention disclosed in FIG. 1.

The embodiment illustrated in FIG. 2 has several advantages over the embodiment illustrated in FIG. 1. Thus, for example, the overall energy conversion efficiency is increased significantly when the process of the invention is integrated with a dual-fluid bed gasification system that is employed to convert solid carbonaceous feedstocks into a fuel-gas product, containing hydrocarbons, that is subsequently reformed into carbon monoxide and hydrogen using the waste-heat effluent from the combustion side of the dual-fluid-bed process. Moreover, the integration of the processes as disclosed herein results in substantial capital-cost reductions when solid carbonaceous feedstocks are utilized for the production of high-quality synthesis gases.

Figure 3:
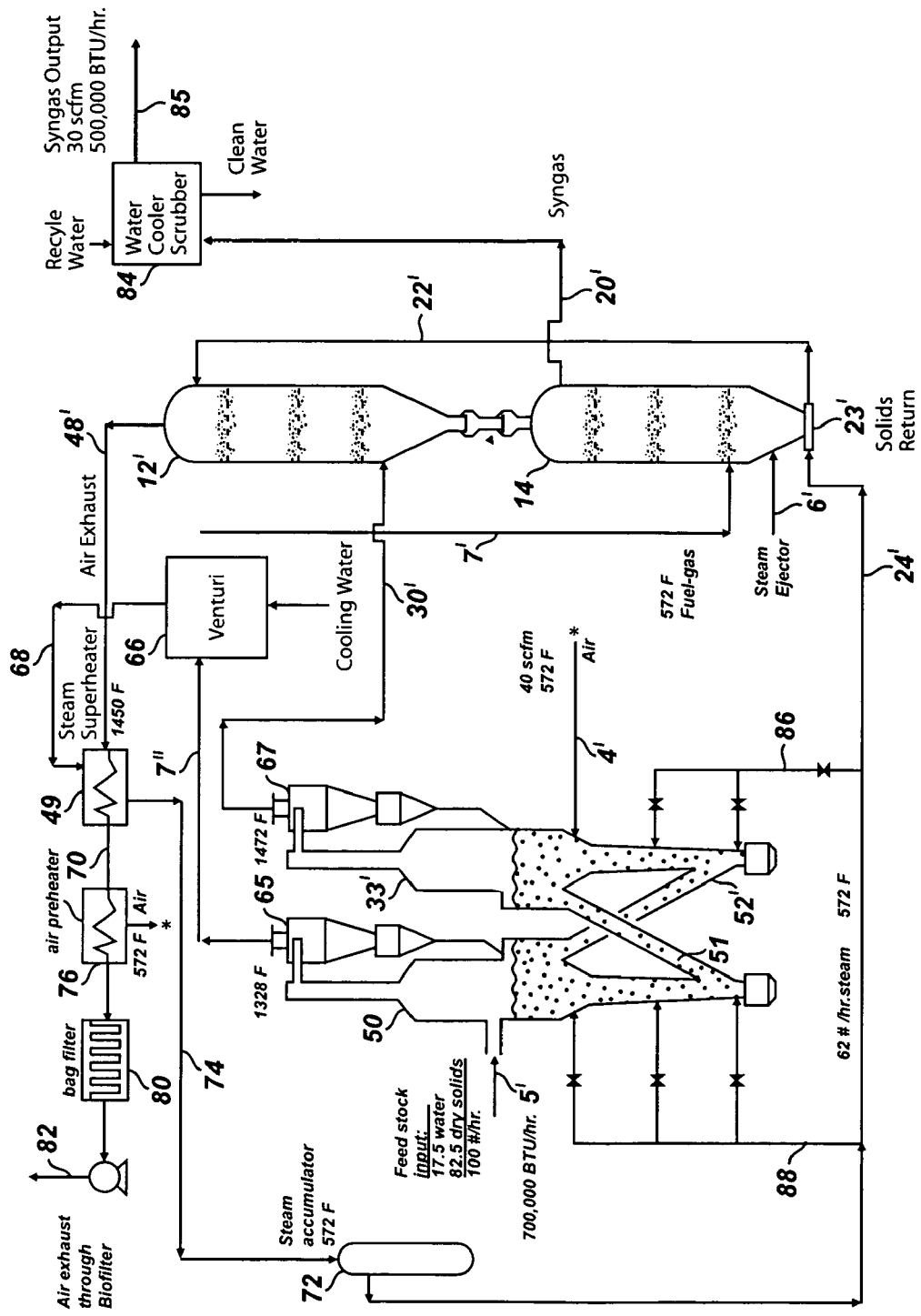
FIG. 3 is a schematic representation of an embodiment based on FIG. 2 showing additional detail and guideline operating parameters for a 100 lb/hr wet feed, 1 ton/day dry feed reformer system in accordance with one embodiment of the present invention.

FIG. 3 is another embodiment which is based on FIG. 2 with additional optional details and features. Each of the fluid-bed gasification reactor 50 and fluid-bed combustor 33' can also include a separator 65 and 67, respectively which remove entrained particulates from the gaseous effluent and return the particulate material to the respective bed material. Suitable separators can include any high temperature particulate removal device such as, but not limited to, high-temperature cyclones, gravity, inertia, and impact separators.

A hot combustion exhaust-gas effluent is discharged via line 30 from the fluid-bed combustor 33'. The hot combustion exhaust-gas effluent is generally drawn off at a temperature which significantly exceeds that required for reforming. This is beneficial since heat recovered from the hot combustion exhaust gas effluent can provide all the heat required to accomplish the reforming process. Further, oil and tar can be removed from gasification reactor 50, e.g. by condensation with other components, and then injected into the combustor 33'. This can allow for more complete cracking of materials and a reduction in required fuel feedstock.

A venturi contactor 66 having a cooling water source can be used to transfer heat from the hot fuel-gas effluent to the cooling water to form the fuel-gas effluent conveyed through line 7' and a heated steam which is drawn off through line 68. Although a venturi contactor is currently preferred, other heat transfer methods can also be suitable such as a spray-quench tower or direct-contact liquid scrubber. The heated steam can be further heated by directing hot flue gas from the heater-generator 12' along line 48' to a steam super-heater 49 to form a superheated steam and a partially cooled flue gas. The superheated steam can then be directed to a steam accumulator 72 along steam line 74. Partially cooled flue gas can be conveyed to an air preheater 76 along line 70 to form a heated air and a further cooled flue gas. The heated air can be directed to line 4' as combustion air in the fluid-bed combustion reactor 33' or used in other portions of the process. The further cooled flue gas can then be sent through a suitable bag house 80 or other particulate removal system and through other optional flue gas treatment systems such as a biofilter and stack exhaust pump 82 before release to the atmosphere. Other flue gas scrubbing and treatment systems can also be designed by those skilled in the art based on environmental, economic and other such considerations. Heated steam sent to the steam accumulator 72 can be useful throughout the process. In particular, the heated steam can be directed to the combustor 33' and the gasification reactor 50 via steam lines 86 and 88, respectively, as the primary fluidizing medium for each of the beds. Further, at least a portion of the heated steam can be used to supplement or entirely supply the motive gas along line 24' for solids return via the venturi eductor 23' of the reactor-reformer 14'.

Returning to the reactor-reformer 14', the gaseous effluent product is withdrawn through duct 20'. This gaseous effluent can be directed to a water cooler and scrubber 84 which is designed to cool the effluent to a suitable temperature and scrub the gaseous effluent of any residual particulate materials, entrained heat carrier, or entrained solid reactant using a recycle water or other suitable liquid contact media, and then directed through a line 85 to syngas compress systems not shown. The water cooler and scrubber can be any suitable liquid gas contactor which is configured for removal of particulates from the gaseous effluent. Non-limiting examples of suitable units can include a venturi or cyclone contactor, wet or dry ESP, filters, combinations of these, or the like.

The overall processes taught herein also have many advantages over currently-employed processes. The processes of this invention are extremely effective for steam and $CO_2$ reforming a light hydrocarbon in that the process avoids the problems encountered in employing a steam reforming furnace, i.e., the difficulties involved in both effective heat transfer through tubes at high temperatures and high heat flux and carbon deposition and fouling of a traditional pelletized reforming catalyst, resulting in improved economy. In addition, capital costs are reduced, since the use of expensive high temperature resistant alloys is minimized. Furthermore, the use of very finely divided low-cost reactants, instead of catalyst pellets heretofore employed, leads to a lower investment cost.

Moreover, the preferred reactants, composed of iron, iron oxide, and iron mixed with calcium oxide, and promoted with potassium, for example, have not been used successfully heretofore in reforming processes because these reactant materials are converted into very finely divided powder without structural strength as a result of reduction-oxidation (redox) thermal processing and are, therefore, not useful in traditional reforming equipment, including the fluid-bed process disclosed in U.S. Pat. No. 3,524,819, which has never achieved commercial viability because of inherent limitations.

The invention disclosed herein includes the use of a substantially inert heat-carrier, composed of e.g. alumina, zirconia, or titania, beads that maintain their structural strength and substantially spherical integrity during high-temperature thermal processing and provide the means for accomplishing uniform circulation between the reactor and the regenerator, while the ultra-fine reactant powders are thus allowed to circulate within the process, and to pass into and out of the process, thus contributing a high rate of reactivity without the need for structural strength.

Additionally, the reactants disclosed herein do not function as a typical reforming catalyst, such as nickel or nickel supported on alumina, which is thought to hold and stabilize a hydrocarbon molecule during reforming and thereby lower its activation energy. In contrast, the reactants disclosed herein participate actively in redox reactions as shown below in the unbalanced equations, where M represents a metal species, such as iron, and a series of complex reactions result in cyclic reduction and oxidation of the metal species:

Metal Reduction $$M_yO_x + C_nH_m \rightarrow M_yO_{x-1} + CO + H_2$$

$$MO + C_nH_m \rightarrow M + CO + H_2$$

Metal Oxidation $$M_yO_{x-1} + H_2O \rightarrow M_yO_x + H_2$$

$$M_y + CO_2 \rightarrow M_yO_x + CO$$

With regard to the use and function of metals and metal oxides operating as reactants, as taught herein, it becomes apparent that a distinction in function results because in a POX (partial oxidation) methodology, the "solids" are contacted with gaseous streams maintained at essentially constant oxidation potential, and therefore during processing the solids are maintained at a constant oxidation state, whereas in the process of the invention the solids are circulated between chambers with substantially different oxidation potential, and consequently, certain materials, including iron, undergo known transitions between oxidation states, which transition is referred to as "redox" processing, because the materials are cyclically reduced and then oxidized.

Thus, in the process of the invention, considering an embodiment using iron as an example, the iron serves as a reactant rather than as a catalyst because the oxidation state of iron is "reduced" when contacted with the hydrocarbon gases that are reformed, and thereafter the oxidation state of iron is sequentially increased incrementally by contacting with combustion exhaust gases having a higher oxidation potential than the reformate gases. Furthermore, an unexpected benefit is obtained by controlling the oxidation potential in the hot combustion exhaust gases because the metal reactants are less reactive to hydrocarbon containing gases when fully oxidized and are essentially unreactive when fully reduced. Therefore, providing the ability to maintain the most active oxidation state of the particulate metal solids used to enhance the rate of reforming is a benefit that is attributed to the process of the present invention.

Although various materials are contemplated as having utility as reactant solids, iron ore and iron ore promoted with potassium, is useful in an embodiment due to, among other reasons, cost effectiveness. With regard to an embodiment using iron ore as a reactant solid, iron ores are rocks and minerals from which metallic iron can be economically extracted. The ores are usually rich in iron oxides and vary in color from dark grey to rusty red. The iron itself is usually found in the form of magnetite ($Fe_3O_4$), hematite ($Fe_2O_3$), limonite (FeO(OH).$nH_2O$) or siderite ($FeCO_3$). Hematite is also known as "natural ore" and refers to the early years of mining, when certain hematite ores contained 66% iron and could be fed directly into steel-making blast furnaces. Hematite is still the most common form of iron ore that is available for industrial applications and is a low-cost form of iron that can be used as a reactant solid in the process of the invention and the use of crushed hematite is a preferred embodiment.

Another embodiment utilizes FeO as the reactant solid. FeO is the most reactive oxidation state of iron required to achieve a significant enhancement of the reforming process, while $Fe_3O_4$ is relatively less reactive and fully reduced Fe metal is almost unreactive with hydrocarbon containing fuel-gases, except to the degree that these fuel-gases contain oxygen bearing compounds. Therefore, the processing of the present invention allows for the ability to control and maintain the most reactive oxidation state of iron. The ability to maintain the fraction of FeO above 50% relative to other forms of iron in the system is one contemplated embodiment.

Metallic Fe is oxidized when brought in contact with hot combustion exhaust gases. The degree of oxidation is primarily a function of the oxidation potential of the exhaust gases, while contact time and temperature also influence the degree of oxidation. Maintaining free oxygen in the hot exhaust gases below about 3%, while providing combined $CO_2$ and $H_2O$ content above about 10% and CO content between about 0.5% and 10%, all to serve as sources of oxygen with low oxidation potential relative to metallic Fe, is an embodiment of the present invention.

As can be seen from the above equations, there is a significant difference in the use of reactant solids as taught herein, and the use of a catalyst material of the prior art. Generally, previous approaches for steam reforming of hydrocarbons relied on POX methodology wherein the heat needed to accomplish the thermal chemical reforming reactions is supplied by exothermic reactions that include oxygen, such that the heat generated is conveyed and utilized as sensible heat carried by the gases intended to be reformed. The subject invention relies on heat transferred via circulation of solids from one chamber to another, and the hot gases that result from exothermic reactions with oxygen are maintained as a separate stream that is not comingled with the reformed product stream. Current trends embrace the use of catalytic processing along with POX methodology to minimize the amount and cost of oxygen consumed by lowering the operating temperature; the combined catalyst/POX approach is classified as a "partial oxidation" process and, strictly speaking, is not a "reforming" process of the class disclosed herein. A POX process consumes oxygen as a principal reactant that is combined with the feed stream in order to generate exothermic heat, and the products of partial oxidation are included in the product stream, while, on the contrary, reforming processes do not consume oxygen as a principal reactant, though elemental oxygen is present in the feed, and participates in the endothermic reforming reactions; moreover, the combustion products generated to supply heat for endothermic reforming reactions are continuously separated from the syngas product stream.

A further benefit of the process of the present invention is that hot combustion exhaust gases can be controlled to maintain a low oxidation potential in order to predominately generate FeO (e.g. in the case of iron as the solid reactant) as compared to $Fe_3O_4$ and $Fe_2O_3$ which also creates an environment where $NO_R$ can be selectively reduced to $N_2$ by contact with Fe and FeO, which serves to eliminate the need for post-combustion catalytic treatment of the exhaust gases, such as the use of selective catalytic reduction of $NO_x$, although a final catalytic oxidation of CO, accomplished up-stream of a heat recovery boiler, known also as a CO-boiler, is required in most jurisdictions.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A process for producing carbon monoxide and hydrogen containing effluent gas, comprising:
    a) introducing a fuel gas and a reformer gas into a reactor system, said fuel gas including a hydrocarbon, and said reformer gas including at least one of steam or $CO_2$;
    b) reacting the fuel gas and the reformer gas with a reactant solids under steam reforming temperatures and pressures to produce a carbon monoxide and hydrogen containing effluent and a spent solids; and
    c) withdrawing the effluent from the reactor system.

2. The process of claim 1, wherein a mixture of the fuel gas and reformer gas is introduced into the reactor system.

3. The process of claim 1, wherein the reformer gas includes the steam.

4. The process of claim 1, wherein the hydrocarbon comprises a member selected from the group consisting of methane, ethane, propane, butane, naptha, and combinations thereof.

5. The process of claim 1, wherein a mass ratio of steam and $CO_2$ to hydrocarbon is from about 0.1 to about 4.0.

6. The process of claim 1, wherein the step of reacting occurs under partial oxidation conditions of the reactant solids.

7. The process of claim 1, wherein the steam reforming temperatures are from about 1650° F. to about 1850° F.

8. The process of claim 1, further including heat carrier particulates in the reactor system.

9. The process of claim 8, wherein the reactant solids are dispersed in the heat carrier.

10. The process of claim 8, further comprising preheating the heat carrier particulates with a hot flue gas.

11. The process of claim 8, wherein the heat carrier particulates are substantially spherical.

12. The process of claim 8, wherein the heat carrier particulates are ceramic solids.

13. The process of claim 1, further comprising regenerating the spent solids to form regenerated reactant solids and recycling the regenerated reactant solids for reaction with the fuel gas and reformer gas.

14. The process of claim 13, further comprising heat carrier particulate within the reactor system, wherein the heat carrier particulates are preheated and the reactant solids are regenerated substantially simultaneously.

15. The process of claim 1, wherein the reactant solids are finely divided metal or metal oxide reactants.

16. The process of claim 1, wherein the reactant solids comprise a member selected from the group consisting of calcium, calcium oxide, iron, iron oxide, and combinations thereof.

17. The method of claim 1, wherein the reacting of the fuel-gas and the reformer gas with the reactant solids is accomplished in a counter-current moving bed reactor.

18. The method of claim 17, wherein the particulate solids flow generally downward within the counter-current moving bed reactor while the fuel gas and reformer gas move generally upward within the counter-current moving bed reactor.

* * * * *